United States Patent
Moran et al.

(10) Patent No.: US 8,062,801 B2
(45) Date of Patent: Nov. 22, 2011

(54) AVOIDING COOLANT SLUMP INTO REACTANT FIELDS DURING PEM FUEL CELL SHUTDOWN

(75) Inventors: Mark J. Moran, Northampton, MA (US); Venkateshwarlu Yadha, Manchester, CT (US); Matthew P. Wilson, Groton, CT (US)

(73) Assignee: UTC Power Corporation, South Windsor, CT (US)

( * ) Notice: Subject to any disclaimer, the term of this patent is extended or adjusted under 35 U.S.C. 154(b) by 388 days.

(21) Appl. No.: 12/310,607

(22) PCT Filed: Aug. 31, 2006

(86) PCT No.: PCT/US2006/034042
§ 371 (c)(1),
(2), (4) Date: Feb. 27, 2009

(87) PCT Pub. No.: WO2008/027043
PCT Pub. Date: Mar. 6, 2008

(65) Prior Publication Data
US 2010/0239927 A1    Sep. 23, 2010

(51) Int. Cl.
*H01M 8/04* (2006.01)

(52) U.S. Cl. ....................................................... 429/429
(58) Field of Classification Search .................. 429/428, 429/429
See application file for complete search history.

(56) References Cited

U.S. PATENT DOCUMENTS

| | | | |
|---|---|---|---|
| 6,514,635 B2 * | 2/2003 | Van Dine et al. | 429/415 |
| 6,635,370 B2 * | 10/2003 | Condit et al. | 429/415 |
| 6,835,479 B2 * | 12/2004 | Balliet et al. | 429/429 |
| 6,984,464 B2 * | 1/2006 | Margiott et al. | 429/429 |

* cited by examiner

Primary Examiner — Jerry A Lorengo
Assistant Examiner — Carlos Barcena
(74) Attorney, Agent, or Firm — M. P. Williams

(57) ABSTRACT

A fuel cell power plant (100) having a stack of fuel cells (102), each having an anode (104), a fuel reactant gas flow field plate (118), a cathode (106), an oxidant reactant gas flow field plate (120), and an electrolyte (101) between the anode and cathode. The stack has coolant channels (131), an air blower (144), air inlet (139a) and outlet (141a) valves, and a cathode recycle loop using either the primary air blower or a cathode recycle blower (135). A shutdown process includes recycling air through the cathodes with only one of an air inlet valve or air exit valve closed, while applying fresh fuel and recycling fuel through the anodes until oxygen is about 4% or less, or average cell voltage is about 0.2 or less, or for predetermined period of time.

7 Claims, 2 Drawing Sheets

_US 8,062,801 B2_

AVOIDING COOLANT SLUMP INTO REACTANT FIELDS DURING PEM FUEL CELL SHUTDOWN

TECHNICAL FIELD

Procedures for purging the anode and cathode reactant flow fields during shutdown of a proton exchange membrane (PEM) fuel cell system avoid coolant slump into the reactant flow fields.

BACKGROUND ART

In PEM fuel cell systems, it is well known that, when the electrical circuit is opened and there is no longer a load across the cell, such as upon and during shutdown of the cell, the presence of air on the cathode, coupled with hydrogen fuel remaining on the anode, often cause unacceptable electrode potentials, resulting in catalyst and catalyst support oxidation and corrosion and attendant cell performance degradation. Inert gas has been used to purge both the anode flow field and the cathode flow field immediately upon cell shutdown to passivate the anode and cathode so as to minimize or prevent such cell performance degradation.

It is desired to avoid the costs associated with storing and delivering a separate supply of inert gas to fuel cells, especially in automotive applications where compactness and low cost are critical, and where the system must be shut down and started frequently. In U.S. Pat. No. 6,635,370, a fuel cell system is shut down by disconnecting the primary load, shutting off the air flow, closing air inlet and air outlet valves and controlling the fuel flow into and out of the system in a manner that results in the fuel cell gases coming to equilibrium across the cells, with the fuel flow shut off, with gas composition of a small amount of hydrogen, balance fuel cell inert gases. These inert gases do not react with hydrogen or oxygen within the fuel cell, and do not otherwise harm cell performance to any significant extent, and are, therefore, harmless to the fuel cell. Fuel cell inert gases may also include trace amounts of elements found in atmospheric air. If the fuel is high purity hydrogen and the oxidant is air, the "balance" fuel cell inert gas will be substantially all nitrogen, with a small amount of carbon dioxide found in atmospheric air, plus trace amounts of other elements found in atmospheric air.

In the aforementioned patent, after disconnecting the primary load and shutting off the air supply to and exhaust from the cathode flow fields, fuel continues to be fed to the anode flow fields until the remaining oxidant is consumed. This oxidant consumption is aided by recycling gas from the cathode exit to the cathode inlet, and by having a small auxiliary load applied across the cell, which also quickly drives down the cathode potential. Recycling the cathode gas assures good mixing of the remaining gas in the cathode, so that oxygen will be spread more uniformly throughout the fuel cells and thereby be more quickly consumed.

As the cathode gas is recycled, hydrogen in the anode flow field diffuses to the cathode through the membrane so that the oxygen in the cathode flow field is consumed, resulting in a total lesser volume of gas in the cathode flow fields, with an increasing concentration of nitrogen and other gases found in the atmosphere. The consumption of oxygen from the cathode flow fields results in a gas pressure drop in the cathode. When the cathode inlet and exit valves are closed, a vacuum is formed. Any water remaining in the coolant flow channels adjacent to the porous, hydrophilic oxidant reactant gas flow field plates, with no positive pressure differential between the cathode flow fields and the coolant channels, will flow into the cathode flow fields. This is sometimes referred to as water "slump".

Coolant plates that are both porous and hydrophilic are sometimes called water transport plates (WTPs). The WTP allows coolant from the coolant channels to flow both through the plane and in the plane within the plate. The WTP is distinguished from fuel cells with solid cooler plates by having a direct interface between the reactant gases and coolant. As a result, there is a criticality to balancing the pressure between the reactants and the coolant in order to maintain the location of coolant and reactants within the coolant section of the cell structure. Without a positive reactant gas pressure over coolant pressure, the coolant stream could flood the reactant cavities with coolant as claimed in U.S. Pat. Nos. 5,705,951 and 5,853,909. A fuel cell shut down with coolant/water contained in the reactant cavities will be more difficult to start and may be impossible to start from a frozen condition.

SUMMARY

Desirable aspects include: eliminating water slump as a result of consumption of residual oxygen during shutdown of a fuel cell system; consuming residual oxygen during fuel cell system shutdown without the need for prior draining of the coolant; shutting down a fuel cell power plant with a procedure that does not require draining water from the stack before reducing oxygen in the cathodes while avoiding slump of water from water passages into reactant gas passages; an oxygen reducing shutdown procedure that ensures water-free and ice-free reactant passages at the time of a subsequent start up; and improved fuel cell system shutdown procedure.

A predication is the discovery that the vacuum created in the oxidant flow field, while providing fuel to the anode and recycling the oxidant stream during shut down of a fuel cell system, can be prevented by leaving an oxidant valve, either inlet or exit, at least partly open. Only a small amount of replacement gas is drawn into the oxidant flow fields as the consumed oxygen is replaced. The oxidant flow field will finally stabilize at atmospheric pressure.

For cells operating near ambient pressure, the reactant/coolant pressure difference is established by lowering the coolant pressure below ambient. During a shutdown of WTP fuel cells using an $H_2$-on (low corrosion environment) conditioning process, the coolant pump remains operational during the conditioning cycle. The cycle runs until most of the oxidant system $O_2$ is consumed, typically by applying an auxiliary load. The oxidant system $O_2$ is considered consumed when the system reaches a condition where the average cell voltage is less than 0.2 volts per cell. Other conditioning cycle end points may be either when the $O_2$ level drops below about 4% or at the end of a fixed predetermined period of time. With the coolant pump running, the coolant pressure remains steady but gas pressure on the cathodes starts dropping as $O_2$ consumption takes place. This pressure drop allows coolant to infiltrate and possibly flood the oxidant reactant passages. To prevent this coolant flooding, called coolant slump, the reactant/coolant pressure difference must be maintained. It has been found that vacuum brakes (such as pressure relief valves) may not accomplish this properly, most likely because of their intermittent operation. However, we have discovered that keeping the reactant gas inlet open (with the vent closed) allows reactant/coolant pressure differences to be maintained and slumping to be prevented while also allowing the $O_2$ consumption to be completed. Once the $O_2$ removal process is completed, the coolant is drained and the pump is shut off. For natural water management type cells (NWM), that is WTP type cells that use evaporative cooling in place of a circulating liquid coolant, the same vacuum issues apply and can be addressed in a similar manner.

Accordingly, the cathode flow fields of a fuel cell system being shut down are maintained at substantially atmospheric pressure by maintaining either an air inlet valve open while closing an air exit valve, or maintaining an air exit valve open while closing an air inlet valve. The procedure herein may be used with systems employing a hydrogen supply to support the consumption of residual oxygen, with or without a cathode recycle blower, and a cathode recycle loop. While not likely, it is recognized that the cathode flow fields of a fuel cell system could also be maintained at substantially atmospheric pressure using a fuel supply feed instead of the air system. Additionally, a fuel cell system shut down with the procedure herein will be capable of restarting from a frozen condition.

Other aspects, features and advantages of the procedure herein will become more apparent in the light of the following detailed description of exemplary embodiments thereof, as illustrated in the accompanying drawing.

MODE(S) OF IMPLEMENTATION

Figure 1:
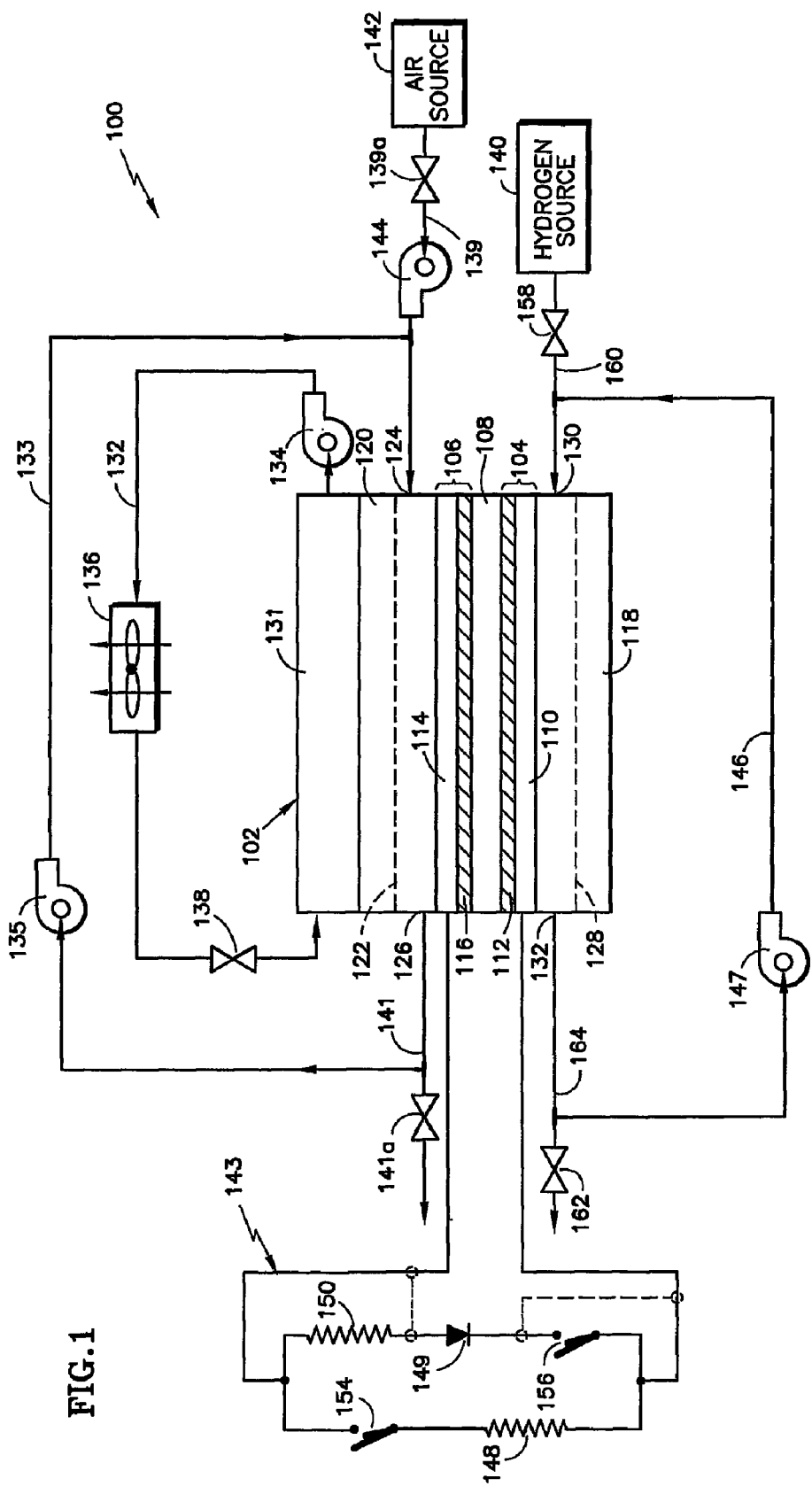
FIG. 1 is a schematic diagram of a first embodiment of a fuel cell system that may be shut down in accordance with the procedure hereof.

In FIG. 1, a fuel cell system 100 includes a fuel cell 102 comprising an anode 104 (which may also be referred to herein as the anode electrode), a cathode 106 (which may also be referred to as the cathode electrode), and an electrolyte 108 disposed between the anode and cathode. The electrolyte may be in the form of a proton exchange membrane (PEM) of the type described in U.S. Pat. No. 6,024,848. The anode includes an anode substrate 110 having an anode catalyst layer 112 disposed thereon on the side of the substrate facing the electrolyte 108. The cathode includes a cathode substrate 114, having a cathode catalyst layer 116 disposed thereon on the side of the substrate facing the electrolyte 108. The cell also includes an anode flow field plate 118 adjacent the anode substrate 110 and a cathode flow field plate 120 adjacent the cathode substrate 114.

The cathode flow field plate 120 has a plurality of channels 122 extending thereacross adjacent the cathode substrate forming a cathode flow field for carrying an oxidant, such as air, across the cathode from an inlet 124 to an outlet 126. The anode flow field plate 118 has a plurality of channels 128 extending thereacross adjacent the anode substrate forming an anode flow field for carrying a hydrogen-containing fuel across the anode from an inlet 130 to an outlet 132. Each cell also includes coolant flow fields 131 between the reactant gas flow field plates 118, 120 for removing heat from the cell, such as by using a water pump 134 to circulate water through a loop 132 that passes through the coolant flow fields 131, a radiator 136 for rejecting the heat, and a flow control valve or orifice 138.

Although only a single cell 120 is shown, a fuel cell system comprises a stack of adjacent cells connected electrically in series, each having a coolant flow field (not shown) between the cathode flow field plate of one cell and an anode flow field plate of the adjacent cell. More detailed information regarding fuel cells like the one represented in FIG. 1, is available in U.S. Pat. No. 5,503,944. The '944 patent describes a solid polymer electrolyte fuel cell wherein the electrolyte is a proton exchange membrane (PEM).

The fuel cell system of FIG. 1 includes a source 140 of hydrogen containing fuel and a source 142 of air. The fuel may be high purity hydrogen or other hydrogen rich fuel, such as reformed natural gas or gasoline. A conduit 139 carries air from the source 142, typically the ambient surroundings, into the cathode flow field inlet 124; and a conduit 141 carries spent air away from the outlet 126. The conduits 139, 141 each include air inlet and exit valves 139$a$ and 141$a$, respectively, disposed therein. An oxidant recycle loop 133, having an oxidant recycle blower 135 disposed therein, may be used to circulate spent air from the cathode flow field outlet 126 back into the cathode flow field inlet 124.

Figure 2:
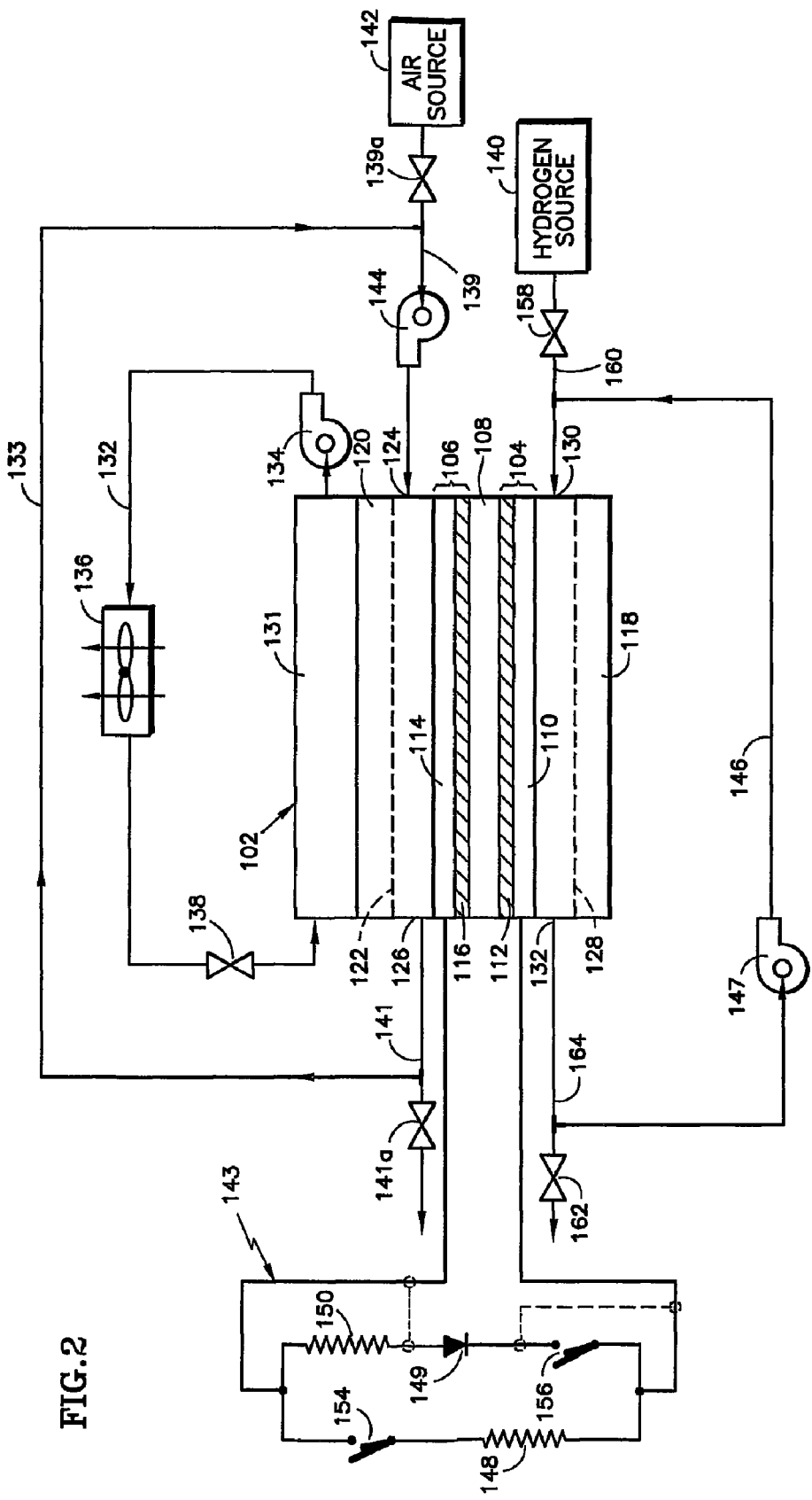
FIG. 2 is a schematic diagram of a second embodiment of a fuel cell system that may be shut down in accordance with the procedure hereof.

The fuel cell system also includes an external electrical circuit 143 connecting the anode and cathode, an air blower 144 disposed within the conduit 139, a fuel recycle loop 146, and a fuel recycle loop blower 147 disposed within the fuel recycle loop. The external circuit 143 includes a primary load 148, and an auxiliary resistive load 150 in parallel with the primary load, and a diode 149 in series with the auxiliary resistive load. The oxidant recycle loop 133 may extend to the inlet of the air blower 144 as shown in FIG. 2, and the oxidant recycle blower 135 may then be omitted. The blower 144 will operate at a lower speed when operating in a recycle mode.

During normal fuel cell operation, a primary load switch 154 is closed (it is shown open in the drawing), and an auxiliary load switch 156 is open, such that the fuel cell is providing electricity to the primary load. The air blower 144, fuel recycle blower 147 and the coolant pump 134 are all on. The air flow valves 139$a$ and 141$a$ are open. A fuel feed valve 158 in a fuel feed conduit 160 to the anode flow field is open, as is an anode exhaust vent valve 162 in an anode exhaust conduit 164. The coolant loop flow control valve 138 is also open; and the coolant pump 134 is on.

Thus, during normal operation, air from the source 142 is continuously delivered into the cathode flow field inlet 124 via the conduit 139 and leaves the outlet 126 via the conduit 141. A hydrogen containing fuel from the source 140 is continuously delivered into the anode flow field via the conduit 160. A portion of the anode exhaust, containing depleted hydrogen fuel, leaves the anode flow field through the vent valve 162 via the conduit 164, while the recycle blower 147 recirculates the balance of the anode exhaust through the anode flow field via the recycle loop in a manner well know in the prior art. Recycling a portion of the anode exhaust helps maintain a relatively uniform gas composition from the inlet 130 to the outlet 132 of the anode flow field, and increases hydrogen utilization. As the hydrogen passes through the anode flow field, it electrochemically reacts on the anode catalyst layer in a well-known manner to produce protons (hydrogen ions) and electrons. The electrons flow from the anode 104 to the cathode 106 through the external circuit 143 to power the primary load 148.

To shut down the operating fuel cell system according to this embodiment of the disclosed procedure, the switch 154 in the external circuit 143 is opened to disconnect the primary load 148. The fuel flow valve 158 remains open; and the fuel recycle blower remains on to continue recirculation of a portion of the anode exhaust. However, the anode exhaust vent valve 162 will remain open or be closed depending upon the percent hydrogen in the incoming fuel and the relative volumes of the anode and cathode sides of the fuel cell, as is explained below.

The flow of fresh air through the cathode flow field is turned off by closing the air exit valve 141*a* and shutting off the primary air blower 144. The oxidant recycle blower 135 is turned on to circulate air from the cathode flow field outlet 126 to the cathode flow field inlet 124. This creates a uniform gas composition within the cathode flow field and ultimately helps speed the fuel cell gases to equilibrium within the cell. The auxiliary load 150 is connected by closing the switch 156. With current flowing through the auxiliary load, typical electrochemical cell reactions occur, causing the oxygen concentration in the cathode flow field to be reduced and cell voltage to be lowered. The hydrogen within the anode flow field supports the cell reaction that consumes the cathode oxygen, and somewhat more slowly diffuses across the electrolyte for additional oxygen consumption.

The application of the auxiliary load is preferably initiated while there is sufficient hydrogen within the fuel cell to electrochemically react the oxidant. The load preferably remains connected at least until either the cell voltage is lowered to a pre-selected value, preferably about 0.2 volts per cell or less, or until the $O_2$ concentrations in the cathode drops below about 4%, or for a predetermined fixed period of time. The diode 149, connected across the cathode and anode, senses the cell voltage and allows current to pass through the load 148 as long as the cell voltage is above the pre-selected value. In that way, the cell voltage is reduced to and thereafter limited to the pre-selected value. When the cell voltage drops to about 0.2 volts per cell, substantially all the oxygen within the cathode flow field, and any that has diffused across the cell, will have been consumed. The auxiliary load may now be disconnected by opening the switch 156; but it is preferred to leave it connected throughout the remainder of the shut down procedure to limit the cell voltage to no more than 0.2 volts per cell while the cell is shut down.

Whether the anode exhaust vent valve 162 needs to be open during the foregoing procedure is determined by the hydrogen concentration of the incoming fuel and the relative volumes of gas space on the anode and cathode sides of the cell. Whether and for how long the fuel needs to continue to flow as the oxygen is consumed is easily determined by persons having ordinary skill in the art, in view of further explanation in the aforementioned '370 patent.

Once all the oxygen within the anode and cathode flow fields is consumed, the fuel feed valve 158 and the anode exhaust vent valve 162, if open, are shut. The fuel recycle blower 147, the oxidant recycle blower 135, and the coolant pump 134 may now be shut-off. However, it may be preferred to keep the auxiliary load switch 156 closed.

The fuel cell system is now considered shut down, which is hereinafter sometimes referred to as in "storage" until the primary load is reconnected and the system is restarted.

In the just-described method of shutting down a fuel cell system of the type shown in FIG. 1, the air inlet valve 139*a* was left open to ensure that there would be no vacuum, of any magnitude, for any period of time during the shutdown procedure. As an alternative, the air inlet valve 139*a* may be closed and the air exit valve 141*a* left open, provided it is open to atmosphere, rather than some further processing apparatus or plumbing. In such a case, any reduction in oxygen caused by reaction within the cathode flow field channels 122 will result in a negative pressure differential across the valve 141*a* so a small amount of atmospheric air will enter the recycle loop 133 through the valve 141*a*.

The cathode recycle blower 135 shown in FIG. 1 may be omitted as shown in FIG. 2, provided the recycle loop is connected upstream of the main air blower 144. In such a case, the main blower 144 may also act as a recycle blower. In a typical case, however, the amount of power applied to the blower 144 will be reduced significantly so as to be appropriate for cathode gas recycling. In such a case, the air exit valve 141*a* may be closed and the air inlet valve 139*a* open, so as to replenish with air the volume of oxygen which is consumed; or, alternatively, the air inlet valve 139*a* may be closed and the air exit valve 141*a* open so as to replenish any consumed oxygen with air. The system including the cathode flow field channels 122 and the recycle loop 133, including the blower 144, will remain stable at atmospheric pressure as air replaces oxygen to the point where no more oxygen is depleted from the channels 122, leaving only nitrogen and other fuel cell-inert gases, as described hereinbefore.

Thus, the disclosed procedure can be implemented in a variety of ways, the important aspect being that one of the air valves leading to ambient is left open from the beginning of the shutdown process until the oxygen is consumed and/or the cell voltages have been driven to a suitably low value. Then, all of the valves in the system may be closed with the pumps off, with or without hydrogen replenishment of some sort, as is disclosed in the prior art.

If desired, either the air inlet valve 139*a* or the air exit valve 141*a* may be omitted without impairing the disclosed procedure. What is needed is air at substantially atmospheric pressure at the cathode recycle loop, without a flow of air through both the process air inlet and process air exit during cathode recycle.

The disclosed procedure reduces oxygen in the stack during shutdown, without draining the water transport plates, while avoiding slump, thus assuring that the reactant gas flow fields will be free of ice and water at the time of a subsequent start-up.

The invention claimed is:

1. A method of shutting down the operation of a fuel cell power plant (100) having a stack of fuel cells (102), each fuel cell having an anode (104) with a fuel reactant gas flow field plate (118), a cathode (106) having an oxidant reactant gas flow field plate (120), an electrolyte (108) disposed between said anode and said cathode, said power plant also having coolant channels (131) either in or adjacent to one or more of said flow field plates, a primary air blower (144) receiving air from ambient atmosphere (142), either directly or through an air inlet valve (139*a*), for flowing air through said oxidant reactant gas flow field plates and then either directly or through an air exit valve (141*a*) to exhaust, there being either an air inlet valve or an air exit valve or both an air inlet valve and an air exit valve, a cathode recycle loop of either (a) a first form extending from exits (126) of said oxidant reactant gas flow field plates to an inlet (139) of said primary air blower or (b) a second form, including a cathode recycle blower (135), extending between exits of said oxidant reactant gas flow field plates and inlets (124) thereof, a source (140) of hydrogen-containing fuel connected exclusively to inlets (130) of fuel reactant gas flow fields in said fuel reactant gas flow field plates, the outflow of fuel from exits (132) of said fuel reactant gas flow fields being connected both through an outlet valve (162) to exhaust and through a fuel recycle pump (147) for returning a portion of the fuel to the inlets of the fuel reactant gas flow field plates, said method comprising:

disconnecting the primary load (148) from the stack; characterized by:
continuing to provide fuel from the source through the fuel inlet valve exclusively to said fuel reactant gas flow fields while operating (c), in said first form, the primary air blower or (d), in said second form, the cathode recycle blower, to circulate gas in the oxidant reactant gas flow field plates from exits thereof to inlets thereof, while maintaining (e) the air inlet valve open, if any, and the air exit valve closed, or (f) the air inlet valve closed and the air exit valve open, if any, either (g) until the concentration of oxygen within the fuel cell stack reaches about 4% or less, or (h) until the average voltage across each fuel cell in said stack is about 0.2 volts or less, or (i) for a predetermined period of time.

2. A method according to claim 1 wherein said disconnecting step is followed by connecting the stack to an auxiliary load (150) (i) with or (ii) without a diode (149) in series with the auxiliary load.

3. A method according to claim 1 wherein said operating step continues until the concentration of oxygen within the fuel cell stack reaches about 4% or less.

4. A method according to claim 1 wherein said operating step continues until the average voltage across each fuel cell in said stack is about 0.2 volts or less.

5. A method according to claim 1 wherein said operating step continues for a predetermined period of time.

6. A process according to claim 1 further characterized by:
after a period of storage time following any of said time periods (g), (h) or (i), opening said air inlet valve (139a), if any, and said air exit valve (141a), if any, and providing hydrogen-containing gas through inlets (130) of said fuel reactant gas flow field plates (118) in a process for starting up said fuel cell power plant (100).

7. A process according to claim 1 further characterized by:
after completion of storing said fuel cell power plant (100) for a period of time during which the ambient temperature is sufficiently low to freeze water,
opening said air inlet valve (139a), if any, and said air exit valve (141a), if any, and providing hydrogen-containing gas through inlets (130) of said fuel reactant gas flow field plates (118) in a process for starting up said fuel cell power plant.

* * * * *